Feb. 9, 1932.  A. TENHULZEN, JR  1,843,962
LUGGAGE CARRIER
Filed May 19, 1930

Inventor
Albert Tenhulzen Jr.

By Emil F. Lange
Attorney

Patented Feb. 9, 1932

1,843,962

UNITED STATES PATENT OFFICE

ALBERT TENHULZEN, JR., OF FIRTH, NEBRASKA

LUGGAGE CARRIER

Application filed May 19, 1930. Serial No. 453,453.

My invention relates to luggage carriers and more specifically to luggage carriers which are specifically adapted for releasable attachment to the front bumper of an automobile.

An object of the invention is the provision of a luggage carrier which is especially adapted for use with farm automobiles to carry produce to the market and to carry provisions and other supplies to the farm.

Another of my objects is the provision of a luggage carrier which may be almost instantly attached to the front bumper of the automobile and which may be removed therefrom without difficulty when not in use.

Another of my objects is the provision of a luggage carrier having a shield for protecting the automobile radiator from the load carried by the luggage carrier.

It is also my object to provide a luggage carrier which is simple in construction, which may be produced at low cost and which may be attached and detached almost instantly.

Figure 1:
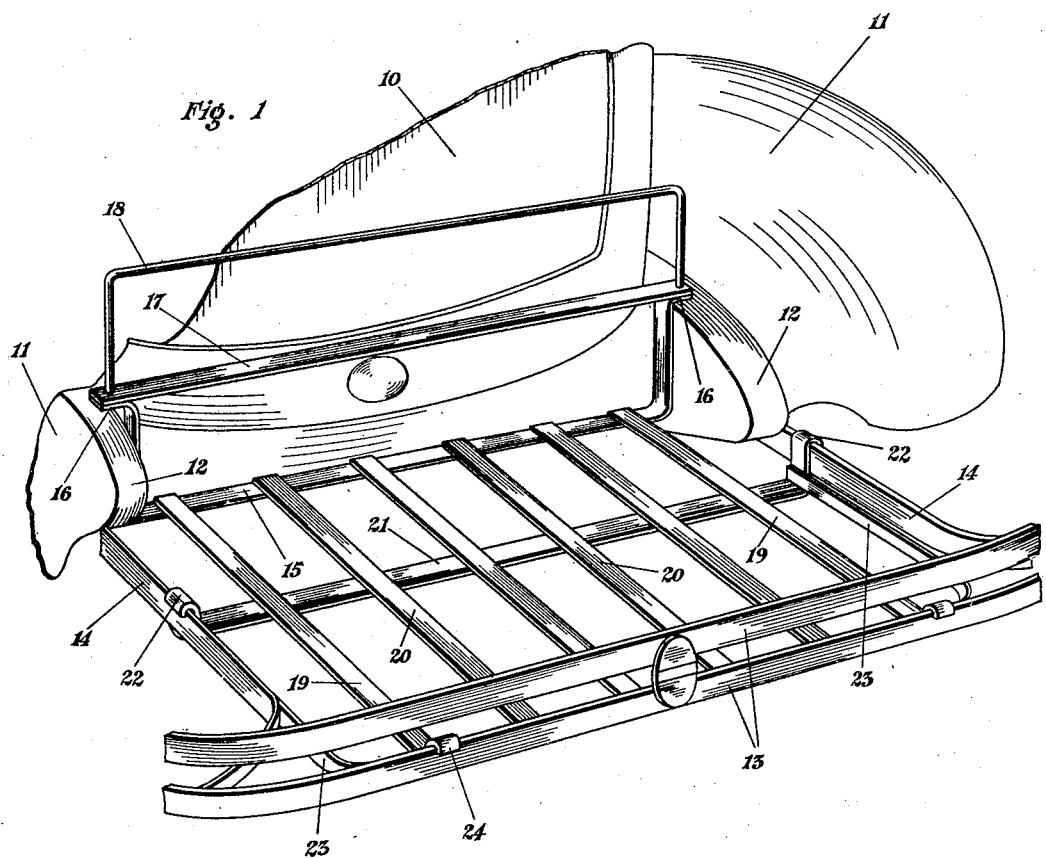

Having in view these objects and others which will be pointed out in the following description, I will now refer to the drawings, in which Figure 1 is an illustration showing a portion of the front of the automobile with my luggage carrier in place.

Figure 2:
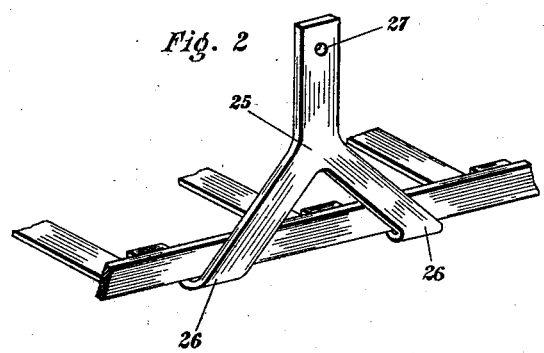

Figure 2 is a view in perspective of a front fragment of my luggage carrier but showing particularly a supplemental fastening device, the view being on a somewhat larger scale than that of Figure 1.

The automobile parts shown in Figure 1 include the radiator 10, the front fenders 11 with the rigid housing 12 for the springs and the front bumper 13 with the bumper supports 14 which are secured at their rear extremities to the frame of the automobile.

The rear supporting member of my luggage carrier includes a U-shaped strap 15 having out-turned end portions 16 which are adapted to rest on the housing members 12. The horizontal strap 17 rests on the out-turned end portions 16 to which it is secured by means of the inverted U-shaped rod 18, the ends of which pass through apertures in the strap 17 and in the out-turned end members 16. These parts may be secured together by means of bolts or they may be riveted in place. The upper horizontal portion of the inverted U-shaped rod 18 is immediately forward of the radiator 10 and it protects the radiator from injury which might otherwise be caused by the load on the luggage carrier especially when driving over rough roads.

Secured to the lower horizontal portion of the U-shaped strap member 15 are forwardly projecting end and intermediate straps 19 and 20. The forward and intermediate straps are further supported on a transverse U-shaped strap 21 having end hook members 22 which are adapted to overlie the bumper supporting members 14. Secured to the transverse U-shaped strap 21 is another U-shaped strap 23, the forward transverse portion of which is secured to all of the straps 19 and 20 at their forward upturned extremities. The end straps 19 are each provided with a hook member 24 similar to the hook members 22 and adapted for hooking over the lower of the two bumper members 13.

In Figure 2 I show additional supporting means for supporting the front end of the luggage carrier. This consists of a Y-shaped strap 25, the lower ends of which are turned rearwardly at 26 into a horizontal direction. The Y-shaped strap 25 is provided with an aperture 27 whereby it may be attached directly to the bumper 13 at its middle point. The Y-shaped strap 25 is usually left in place when the luggage carrier is removed but it is releasable by simply removing one bolt. It is to be understood, however, that the front attaching means 24 and 25 may be used either singly or in combination. When used in combination, either attaching means supplements the other. For ordinary purposes either attaching means alone will be sufficient.

In applying the luggage carrier to the automobile the front of the luggage carrier should first be shoved into the proper position with the rear of the luggage carrier somewhat elevated. As soon as the front attaching means 24 or 25 are in position, the rear of the luggage carrier is forced down so as to bring the outturned ends 16 into position to rest on the frame members 12 of the automobile. When in this position the luggage carrier is ready for use. When it is desired to remove the luggage carrier it is only necessary to first lift the rear end and then to withdraw the front end from engagement with the bumper.

The luggage carrier as above described does not materially affect the traction of the automobile. It has been used for hauling butter, eggs and cream to the market, for hauling seed and other supplies to the field and for hauling supplies for the farm and farm kitchen including even such heavy material as cement. Its use admirably supplements the use of the farm truck which may even be dispensed with when the trips to the market are made with sufficient frequency.

Having thus described my invention in such full, clear, and exact terms that its construction and operation will be readily understood by others skilled in the art to which it pertains, what I claim as new and desire to secure by Letters Patent of the United States is:

1. A luggage carrier adapted for releasable attachment to the front bumper of an automobile, the rear portion of said luggage carrier being U-shaped and adapted to be supported at its extremities on frame parts of the automobile immediately forward and adjacent the automobile radiator, a strap connecting the upper extremities of said U-shaped rear portion, and an inverted U-shaped member secured to said connecting strap at the extremities thereof, said inverted U-shaped member being in close proximity to the automobile radiator.

2. A luggage carrier including a plurality of parallel straps having means at their forward extremities for releasable attachment to the front bumper of an automobile, a strap extending transversely of said parallel straps and having means at its extremities for releasable attachment to the bumper supports, a U-shaped strap at the rear of said luggage carrier and having upper outturned end portions for releasably engaging fixed parts of the automobile, said parallel straps being secured at their rear extremities to the horizontal portion of said U-shaped strap, a horizontal strap secured at its outer extremities to the outturned end portions of said U-shaped strap, and an inverted U-shaped guard secured at its extremities to said horizontal strap and to the outturned end portions of said U-shaped strap, said transverse strap and said guard being positioned transversely of the automobile radiator and in close proximity thereto.

In testimony whereof I affix my signature.

ALBERT TENHULZEN, Jr.